Figure 1:
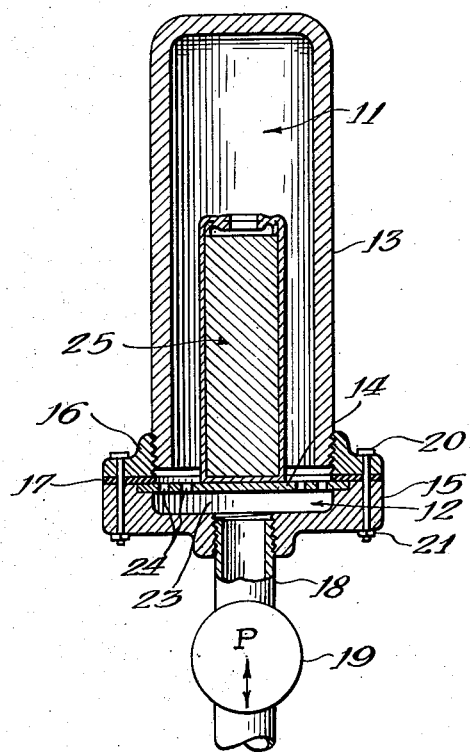

July 22, 1958

E. C. CREUTZ ET AL 2,844,735

METHOD OF TESTING FOR LEAKS

Filed May 8, 1945

INVENTORS:
Edward C. Creutz
William A. McAdams
Martyn H. Foss
By: Roland A. Anderson
Attorney 2,844,735
Patented July 22, 1958

2,844,735

METHOD OF TESTING FOR LEAKS

Edward C. Creutz, Santa Fe, N. Mex., William A. McAdams, Richland, Wash., and Martyn H. Foss, Santa Fe, N. Mex., assignors to the United States of America as represented by the United States Atomic Energy Commission Application May 8, 1945, Serial No. 592,721

3 Claims. (Cl. 250—83.6)

The present invention relates to a method for detecting leaks in jacketed or canned slugs of uranium and pertains more particularly to a sensitive method of determining minute holes in a slug of this type.

In various uses of corrosive metal bodies such as rods, cylinders or other shapes, it is desirable that the bodies be provided with jackets or coverings of relatively inert or non-corrosive metals over their exposed surfaces to prevent oxidation of the metal bodies upon exposure to gases or liquids that are reactive therewith. For example, neutronic reactors used for conducting self-sustaining neutron chain reactions comprise a neutron slowing material (moderator) such as carbon, paraffin, beryllium, $D_2O$, etc. having channels containing a fissionable body such as uranium. In such reactors, the uranium bodies are located in tubular conduits or passages and sufficient uranium bodies are provided to be capable of establishing a self-sustaining neutron chain reaction whereby the bodies are subjected to bombardment by neutrons with the consequent production of various products including radioactive fission products, isotopes of various elements and other products. The conduits or passages in which the bodies are located generally are sufficiently large in diameter to permit passage of a coolant such as air or water therethrough in order to maintain the surface temperature of the bodies within a desired range during neutronic bombardment thereof. Uranium is highly reactive with the oxygen and moisture of air and with water, particularly at elevated temperatures, and hence it is desirable that a suitable jacket or covering of a relatively inert or non-corrosive metal be provided upon the uranium body to prevent corrosion thereof.

In a neutronic reactor of the type disclosed and claimed by Enrico Fermi and Leo Szilard application Serial No. 568,904, filed December 19, 1944, now Patent No. 2,708,656, wherein uranium bodies are subjected to neutron bombardment in tubular aluminum conduits or passages of restricted area, in leakage of the coolant fluid through pinholes or other defects which are present or which develop in the jacket or covering permits reaction of the coolant with the uranium body to generate gases between the body and the enclosing jacket. In such a case sufficient pressure is developed to expand and distort the jacket outwardly thereby increasing the diameter of the jacketed body to an extent that it becomes wedged or jammed within the conduit or passage and cannot be removed therefrom. When uranium bodies undergoing neutron bombardment and establishing a self-sustaining neutron chain reaction become wedged or jammed in this manner, to an extent such that passage of coolant is obstructed, an extremely dangerous condition is presented, which if permitted to continue may cause serious damage to the reactor. Accordingly it is desirable that any incipient failure of the jackets be detected before the jacketed bodies are placed in the reactor.

The problem of detecting such defects is extremely difficult since pinholes or other defects which are too minute for detection by usual methods may cause failure of the jacket in use. Only through use of methods capable of unusual sensitivity can these jacketed uranium bodies be tested satisfactorily.

It is an object of this invention to provide a simple and effective method of detecting minute defects in the form of leaks and the like in the jacket or covering about the uranium or other fissionable bodies.

It is another object of the invention to detect holes in the coatings having a radius of the order of $2.5 \times 10^{-6}$ centimeters or below.

These and other objects of the invention will be readily apparent from the following description.

In accordance with the present invention a very sensitive method has been provided for testing such coated or jacketed bodies to determine their permeability to cooling fluids before their introduction into the reactor. Such a method provides a means by which defective jackets may be detected and provides a means by which the number of slugs which fail during use in the reactor is substantially minimized. In accordance with this method the jacketed uranium body is subjected to a fluid under pressure and thereafter the body is removed from the fluid and the jacket or at least the area adjacent the seal thereof is analyzed, usually qualitatively, for traces of such fluid. A particularly effective method involves the use of a gas such as a radioactive gas for this purpose. In such a case the area adjacent the seal is analyzed for the presence of radioactive material.

The preferred form of jacketed or canned body with which the present invention is concerned, comprises a uranium slug or body such as a rod or tube, preferably cylindrical in shape, suitably coated with a bonding material, such as zinc. The coated uranium slug is then jacketed or canned with a suitable jacket of metal of low neutron absorption such as aluminum. Such jacket generally is in the form of a can or open-ended tube, preferably cylindrical in shape, of the desired wall thickness, usually about .030 inch, and with an aluminum or similar cap or caps hermetically sealed at an end or both ends thereof, and the entire jacket is thoroughly bonded to the uranium slug within. Such a canned slug is more particularly described and claimed in an application of Szilard, Wigner and Creutz, Serial No. 649,030, filed February 20, 1946.

The method comprises several steps, the first being to place a jacketed slug or a plurality of jacketed slugs in an atmosphere of a suitable radioactive gas under pressure, preferebaly a radioactive gas with a half life of about 4 days and emitting beta particles with a range greater than the thickness of the jackets and preferably greater than 3 millimeters in aluminum. The jacketed or canned slug or slugs are left within the atmosphere of the radioactive gas under pressure a sufficient length of time to permit any of the slugs which should have leaks in any form such as minute pin-holes cracks, and the like to collect gas on the inside of the jacketed or canned slug. The slugs are then removed from the chamber or the chamber is evacuated to remove the radioactive gas from the exterior of the slug. Following removal from the radioactive atmosphere, the presence of the emanations from the radioactive gas or fluid within the jacket or flowing therefrom and adjacent said leaks is measured by a suitable counter for the particular emanation, whereby the radioactivity may be detected.

More particularly, the jacketed or canned uranium slugs to be tested are placed in a suitable chamber capable of withstanding pressures within the range of from 100 pounds to 300 pounds per square inch. In the preferred embodiment of the invention, there is introduced within the chamber a radioactive gas at a pressure of 150 pounds per square inch and with a half life of about four days and emitting beta particles with a range of >3 millimeters in aluminum. The slug or slugs to be tested are subjected to the radioactive gas at the preferred pressure for 24 hours. Any leaks in any of the slugs being tested will allow the radioactive gas to collect on the inside of the jacket of the canned slug, where through the emission of radioactive particles from within the canned slug because of leaks therein, the evidence of a defective slug may be readily detected by placing the slug under an appropriate form of counter. It is quite obvious that slugs which are not defective will not affect the counter thus indicating a satisfactory slug, which when used in the neutronic reactor of the type referred to will not cause damage thereto.

Figure 2:
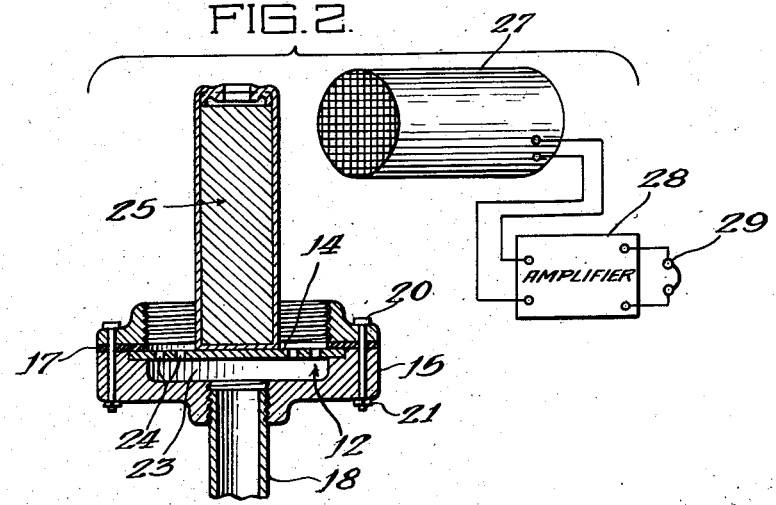

One embodiment of the invention is illustrated in the attached drawings, in which:

Fig. 1 is a sectional view of an apparatus used in the testing of the canned slug showing a canned slug placed within a chamber; and Fig. 2 is a sectional view of the apparatus with the slug exposed and with an instrument employed to detect the presence of radioactive gas within the slug indicated diagrammatically.

As shown in Fig. 1, the chamber 11 is formed by a base 12 and a cap 13 which is attached to the base 12. The base 12 consists of a circular plate 14 which is provided with relatively small holes 24 about its periphery. The plate 14 is mounted upon a support 15. The support 15 forms a cavity 23 between it and the plate 14. The cavity 23 is connected to a pipe 18. An internally threaded circular flange 16 is attached to the support 15 by bolts 20 and nuts 21. A gasket 17 between the flange 16 and the support 15 assures a gas-tight seal between these elements. The pipe 18 is connected to a source of radioactive gas, not shown, through a reversible pump 19. The drawing shows a representative canned slug 25 placed on the plate 14, which is the position used when testing the slug 25. Fig. 2 shows the apparatus described in Fig. 1 with the cap 13 removed and diagrammatically indicates the radiation detecting instrument placed near the slug 25. As indicated, the radiation detecting instrument consists of a radiation counter 27 which is connected to an amplifier 28 and a headset 29.

In carrying out the process, radioactive gas is pumped into the chamber 11 by the pump 19 through the pipe 18. It enters the chamber from the cavity 23 through the holes 24 in the plate 14. The slug 25, which is placed within the chamber 11, is allowed to remain under pressure for a time sufficient to permit any leaks therein to be penetrated by the radioactive gas, and the gas is then removed from the chamber. In this step the pump 19 is reversed to pump the gas out of the chamber 11. The cap 13 may then be removed by unscrewing it from the flange 16. The slug 25 is then exposed to the atmosphere, as shown in Fig. 2, and the radiation counter 27 brought near it. If radioactive gas is concealed within the slug 25 ionization pulses will occur in the counter 27. These pulses will be amplified by amplifier 28 and be audible in the headset 29.

It is obvious that any suitable radioactive material in the nature of a gas may be used though it is preferred to use a radioactive gas emitting beta rays and with a half life as specificed above. Radioactive gases emitting beta rays such as radioactive $Xe^{135}$ having a half life of 5.4 days and radioactive iodine having a half life of 4.0 days are preferred or other radioactive compounds, including gaseous fission products from uranium and the like, emitting beta rays may be used. For example, other suitable radioactive gases, such as radioactive nitrogen, radon, etc. may also be used with appropriate counters to determine the type of emanations therefrom.

The step of determining the presence of the emanations of the radioactive gas is best carried out by means of a suitable electric counter of the ionization chamber or Geiger-Müller type, which is well known to the art. It will be apparent that various other arrangements or devices for determining the presence of the emanations of the concentrations of the radioactive material in the form of a fluid such as a gas may be used, and various modifications of the method of testing disclosed may be made without departing from the scope of the invention as defined by the accompanying claims.

Although the invention is particularly applicable to detecting leaks in fabricated aluminum jacketed uranium slugs for use in a neutronic reactor as disclosed, the present method may also be used to detect leaks, in other forms of closures such as tanks, thermocouples which are hermetically sealed and the like where it is necessary that the closures shall be perfectly sealed.

It will be readily seen that the present method of detecting minute holes in canned or jacketed slugs is sufficiently simple that it may be readily used by employees who are not highly skilled, technically. Furthermore, this method of testing of this invention is unusually sensitive since it is capable of detecting pinholes having a radius as low as $2.5 \times 10^{-6}$ centimeters.

In accordance with a further modification other types of fluids which may be detected within the jacket or as they leak from the pinholes therein may be used. For example, a fluorescent gas or liquid may be used and the jacketed slug exposed to this fluid under pressure. Subsequently the slug may be removed and placed under ultra violet light whereby fluid leaking from the jacket may be detected. Such a process is usually capable of detecting pinholes having a radius as low as about $8.8 \times 10^{-6}$ centimeters.

In accordance with a further modification the slugs may be tested with a fluid and the presence of the fluid in the jacket or adjacent pinholes therein determined by spectrographic analysis. In such test, the slugs are placed in an atmosphere of a readily detectable gas such as helium under a pressure of 300 pounds for 24 hours. The chamber is then evacuated and the jacketed slug analyzed for helium by means of a small mass spectrograph. This process is capable of detecting holes having a radius as low as $2.2 \times 10^{-6}$ centimeters.

Alternatively, the jacket may be tested by submerging it in a solution of a suitable chemical reagent and maintaining it submerged under sufficient pressure as, for example, 150 pounds per square inch and, for a sufficient length of time to permit the reagent to enter the jacket through any flaws or leaks that may exist. Thereafter, the jacketed member is removed from the solution, cleaned, placed in distilled water or other solvent and subjected to a vacuum. Distilled water or any other solvent for the reagent catches any reagent thus withdrawn from the jacket and in a qualitative test of the solvent, the presence of the reagent will indicate whether the jacket leaks, as evidenced by the passage of the reagent therethru. Zinc chloride or palladium chloride are typical of the reagents used, the tests being, respectively, the zinc dithizone method and the nickel acetate-sodium hypophosphite catalytical reagent method.

Although the present invention has been described with particular reference to the specific details of certain embodiments thereof it is not intended that such details shall be regarded as limitations upon the scope of the invention except insofar as included in the accompanying claims.

What is claimed is:

1. The method of testing the fluid leakage of the jacket of a jacketed body, comprising the steps of: submerging the jacketed body in an atmosphere of a radioactive gas under pressure, the radioactive emanations from said gas being sufficiently penetrating to penetrate the jacket of the jacketed body, removing the jacketed body from said atmosphere, and examining the jacketed body for leaks by determining the presence of pockets of the gas within the jacket by measuring the emanations from said gas exterior to the body, said emanations penetrating the jacket from within.

2. The method of testing the seal of a jacketed body, comprising the steps of: subjecting the jacketed body to an atmosphere of a radioactive gas under superatmospheric pressure and having a half life of about 4 days and emitting beta particles with a range greater than 3 millimeters of aluminum, removing the jacketed body from said atmosphere, and examining the jacketed body for leaks by testing for the presence of beta emanations adjacent said jacketed body.

3. The method of testing the fluid leakage of the jacket of a jacketed body, comprising the steps of: submerging the jacketed body in an atmosphere of a radioactive fluid under pressure, the radio-activity of said fluid being sufficiently penetrating to penetrate the jacket of the jacketed body, removing the jacketed body from said atmosphere, and examining the jacketed body for leaks by testing for the presence of fluid pockets within the jacket by detecting the radio-active emanations from said fluid exterior to the body, said emanations having penetrated the jacket.

References Cited in the file of this patent

UNITED STATES PATENTS

| | | |
|---|---|---|
| 1,590,736 | Clark | June 29, 1926 |
| 2,346,043 | Mysels | Apr. 4, 1944 |
| 2,346,423 | Gray | Apr. 11, 1944 |
| 2,358,954 | Teichman | Sept. 26, 1944 |
| 2,429,577 | French | Oct. 21, 1947 |